United States Patent
Tian et al.

(10) Patent No.: US 11,805,222 B2
(45) Date of Patent: Oct. 31, 2023

(54) METHOD, APPARATUS, AND NON-TRANSITORY COMPUTER READABLE MEDIUM FOR VISUALIZING INFRARED RADIATION STRENGTH

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Wen-Biao Tian, Zhengzhou (CN); Yuan-Fang Du, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 17/547,469

(22) Filed: Dec. 10, 2021

(65) Prior Publication Data
US 2022/0311954 A1   Sep. 29, 2022

(30) Foreign Application Priority Data
Mar. 24, 2021   (CN) .......................... 202110314689.5

(51) Int. Cl.
*G06T 5/50* (2006.01)
*H04N 5/33* (2023.01)
(Continued)

(52) U.S. Cl.
CPC .................. *H04N 5/33* (2013.01); *G01J 5/10* (2013.01); *G06T 5/002* (2013.01); *G06T 5/50* (2013.01)

(58) Field of Classification Search
CPC ........ H04N 5/33; G01J 5/10; G01J 2005/106; G01J 1/08; G01J 5/025; G01J 5/026;
(Continued)

(56) References Cited

U.S. PATENT DOCUMENTS 5,841,137 A * 11/1998 Whitney .................. H04N 5/33
                                                      250/338.5
6,028,312 A *  2/2000 Wadsworth ............... G01J 5/24
                                                      250/351

(Continued)

OTHER PUBLICATIONS

He et al. "Infrared machine vision and infrared thermography with deep learning: A review" Infrared Physics & Technology 116 (2021) 103754.*

(Continued)

*Primary Examiner* — Frank F Huang
(74) *Attorney, Agent, or Firm* — ScienBiziP, P.C.

(57) ABSTRACT

A method, an apparatus, and a non-transitory computer readable medium for visualizing infrared radiation strength includes obtaining infrared radiation (IR) image data transmitted by a light sensor; determining a radiation strength distribution and a module emitting mode corresponding to the IR image data; based on the radiation strength distribution and the module emitting mode, determining whether the IR image data meets a predetermined standard; when it is determined that the IR image data meets the predetermined standard, applying a gray processing to the IR image data to obtain a strength gray image; and applying color modulation to the strength gray image to generate a visual energy distribution image.

15 Claims, 3 Drawing Sheets

(51) Int. Cl.
*G01J 5/10* (2006.01)
*G06T 5/00* (2006.01)

(58) Field of Classification Search
CPC . G01J 5/027; G06T 5/002; G06T 5/50; G06T 11/001
See application file for complete search history.

(56) References Cited

U.S. PATENT DOCUMENTS

| | | | |
|---|---|---|---|
| 2012/0013745 A1* | 1/2012 | Kang | G06T 7/70 348/E5.09 |
| 2012/0235579 A1* | 9/2012 | Chemel | F21V 29/60 315/152 |
| 2017/0245803 A1* | 8/2017 | Ahmed | A61B 5/7203 |
| 2018/0007760 A1* | 1/2018 | Ollila | H04N 5/33 |
| 2018/0234603 A1* | 8/2018 | Moore | H04N 23/667 |

OTHER PUBLICATIONS

Kovesi Good Colour Maps: How to Design Them, arXiv:1509.03700v1 [cs.GR] Sep. 12, 2015.*

* cited by examiner

METHOD, APPARATUS, AND NON-TRANSITORY COMPUTER READABLE MEDIUM FOR VISUALIZING INFRARED RADIATION STRENGTH

CROSS-REFERENCE TO RELATED APPLICATIONS

This application claims priority to Chinese Patent Application No. 202110314689.5 filed on Mar. 24, 2021, in China State Intellectual Property Administration, the contents of which are incorporated by reference herein.

FIELD

The subject matter herein generally relates to optical measurement technologies, and particularly to a method, an apparatus, and a non-transitory computer readable medium for visualizing infrared radiation strength.

BACKGROUND

Nowadays, smart terminals may use near infrared laser emitter for three dimensional (3D) detection. Such as structural light of diffracting optical elements using infrared light to investigate structure of object are used in cell phones for high detection precision and low resource usage, and are widely used in the market. An angular instrument is used for a traditional near infrared laser radiation measurement scheme, rotating a near infrared laser source in front of a photoelectric detector or a camera for capturing two dimensional (2D) images of target object, to evaluate radiation strength in every angle. However, the whole process takes a long time, and thousands of rotations are needed for capturing radiation distribution of all required angles. In addition, a gap in detection may occur between two angular rotations, which may miss measurements by radiation of some angle positions, and render data not meeting a predetermined standard and provide low detection efficiency. Furthermore, such data generated during detection cannot be directly observed, which effectively limits rapid detection.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
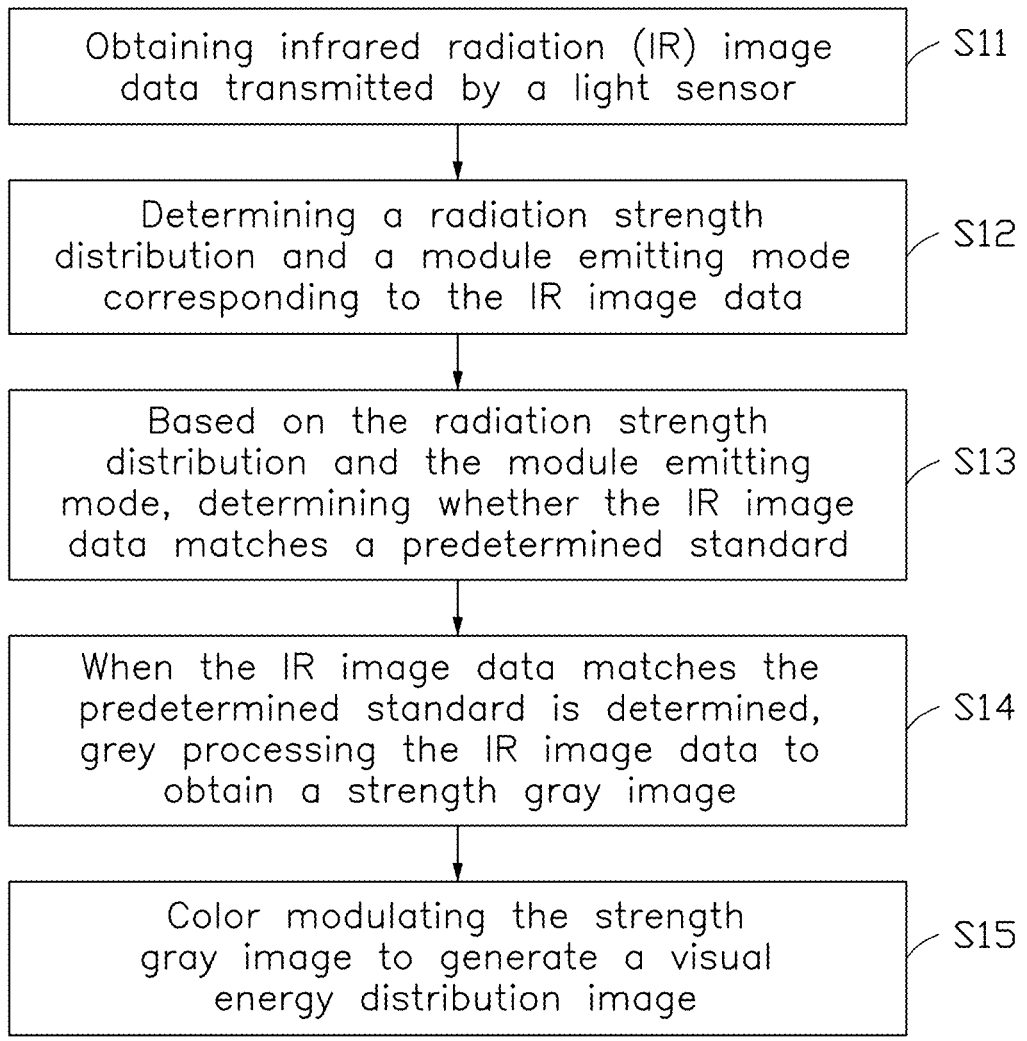
FIG. 1 illustrates a flowchart of at least one embodiment of a method for visualizing infrared radiation strength according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

A method, an apparatus, and a non-transitory computer readable medium for visualizing infrared radiation strength are provided in the present disclosure. The method for visualizing infrared radiation strength may be applied in an apparatus or a server. The apparatus may be a mobile phone, a tablet computer, a laptop, a personal digital assistant (PDA), a smart watch, a game machine, a television, or a display device. The server may be an independent server or a server group formed by a plurality of servers.

FIG. 1 illustrates a flowchart of at least one embodiment of a method for visualizing infrared radiation strength. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S11.

At block S11, obtaining infrared radiation (IR) image data transmitted by a light sensor.

Based on a communication established between a server and the light sensor, obtaining IR image data transmitted by the light sensor. The light sensor may be a camera sensor formed by a plurality of photoelectric semiconductor matrixes arrangement, when the light falls on the sensor formed by the photoelectric semiconductor matrixes arrangement, the sensor converts the light energy into current or voltage in direct proportion, displaying a laser power and a laser energy after any corrections. At the same time, according to coordinates of the photoelectric semiconductor matrixes arrangement, representing a radiation power in a light source 2D plane.

In at least one embodiment, after obtaining the IR image data transmitted by the light sensor, the method further includes: processing the IR image data transmitted by the light sensor, and obtaining processed IR image data. The processing may include signal amplification processing, smoothing processing, and/or signal converting processing. The smoothing processing may be configured to filter noises from the IR image data. The signal converting processing may include converting analog electronic signals into digital electronic signals.

At block S12, determining a radiation strength distribution and a module emitting mode corresponding to the IR image data.

Based on the IR image data information, determining a radiation strength distribution and a module emitting mode corresponding to the IR image data. The radiation strength distribution is configured to show different radiation strength distributions in the IR image data. The module emitting mode may be an emitting mode of an infrared emitting module. The module emitting mode may include a high power mode, a middle power mode, and a low power mode.

In at least one embodiment, the determination a radiation strength distribution and a module emitting mode corresponding to the IR image data includes:

Extracting pixel brightness data from the IR image data;

Inquiring a predetermined brightness radiation mapping table, determining a radiation strength corresponding to the pixel brightness data;

Based on the radiation strength, determining a radiation strength distribution corresponding to the IR image data; and Analyzing the IR image data, determining a module emitting mode corresponding to the IR image data.

The pixel brightness data may be the brightness data corresponding to an image pixel, that is the brightness weight corresponding to the pixel brightness data, for indicating a brightness of the infrared laser. Extracting pixel brightness data corresponding to each pixel in the IR image data, by inquiring the predetermined brightness radiation mapping table, determining a radiation strength corresponding to the pixel brightness data. The predetermined brightness radiation mapping table includes a mapping relation of the brightness and the radiation strength. Based on the radiation strength, determining the radiation strength distribution corresponding to the IR image data.

In at least one embodiment, the analyzing the IR image data, determining a module emitting mode corresponding to the IR image data includes:

Extracting pixel brightness data in the IR image data, and determining a matrix coordinate corresponding to the pixel bright data;

Based on the matrix coordinate, calculating an image spot density corresponding to the IR image data; and Based on the image spot density, determining the module emitting mode corresponding to the IR image data.

In at least one embodiment, after comparing the pixel brightness data with a predetermined brightness threshold, based on a matrix coordinate corresponding to pixel brightness data that is greater than or equal to the predetermined brightness threshold, calculating an image spot density corresponding to the IR image data.

Based on the image spot density, determining the module emitting mode corresponding to the IR image data. In at least one embodiment, setting a density threshold corresponding to the module emitting mode, comparing the image spot density with the density threshold, and determining the module emitting mode corresponding to the IR image data.

At block S13, based on the radiation strength distribution and the module emitting mode, determining whether the IR image data meets a predetermined standard.

In at least one embodiment, presetting a comparison standard of the radiation strength distribution and the module emitting mode, different module emitting modes corresponding to radiation strength distribution of different standards. When the radiation strength distribution and the module emitting mode meet the comparison standard, determining that the IR image data meets the predetermined standard; when the radiation strength distribution and the module emitting mode do not meet the comparison standard, determining that the IR image data does not meet the predetermined standard.

In at least one embodiment, the method further includes:

When it is determined that the IR image data does not meet the predetermined standard, generating indication according to a predetermined indication rule.

In at least one embodiment, after generating the indication, transmitting the indication to a target user terminal, which may be a mobile phone, a tablet computer, a laptop, a personal digital assistant (PDA), a smart watch, a game machine, a television, or a display device.

At block S14, when it is determined that the IR image data does meet the predetermined standard, applying a gray processing to the IR image data to obtain a strength gray image.

In at least one embodiment, based on the pixel brightness data in the IR image data, gray processing the IR image data to obtain a strength gray image. Pixels with different brightness are gray processed with different levels, that is, pixels with different brightness may obtain different gray values after being gray processed. For instance, in the IR image data, a brightness of a pixel A is greater than a brightness of a pixel B, after being gray processed, a gray value of the pixel A is greater than a gray value of the pixel B.

In at least one embodiment, gray processing the IR image data to obtain a strength gray image includes:

Extracting an image pixel in the IR image data;

Setting the image pixel as a center of a circle, establishing a gray gradient circle; and Based on the gray gradient circle, applying a gray processing to the image pixel to obtain the strength gray image.

Extracting an image pixel in the IR image data, setting the image pixel as a center of a circle, establishing a gray gradient circle, based on the gray gradient circle, applying a gray processing to the image pixel to obtain the strength gray image. A radius of the gray gradient circle may be set according to actual needs. By establishing a gray gradient circle, based on the gray gradient circle, applying a gray processing to the image pixel to obtain the strength gray image, a gray processing efficiency may be improved.

In at least one embodiment, the based on the gray gradient circle, applying a gray processing to the image pixel to obtain the strength gray image includes:

Determining a brightness corresponding to the image pixel;

Inquiring a predetermined brightness gray mapping table, determining a gray value corresponding to the brightness; and Based on the gray gradient circle and the gray value, applying a gray processing to the image pixel to obtain a strength gray image.

Based on the brightness corresponding to the image pixel, determining a gray value of the image pixel after being gray processed, and based on the gray value, applying a gray processing to the image pixel. In at least one embodiment, presetting a brightness gray mapping table, including a mapping relation of the brightness and the gray value. The gray value may be a target gray value of the image pixel after being gray processed.

In at least one embodiment, the setting the image pixel as a center of a circle, establishing a gray gradient circle includes:

Determining a data volume corresponding to the IR image data;

Based on the data volume, determining a radius of the gray gradient circle; and

Based on the radius, setting the image pixel as a center of a circle, establishing the gray gradient circle.

In at least one embodiment, based on a pixel volume corresponding to the IR image data, determining the data volume corresponding to the IR image data; based on the data volume, determining a radius of the gray gradient circle, the data volume and the radius of the gray gradient circle being in an inverse proportion. For instance, the greater the data volume, the smaller will be the radius of the gray gradient circle; the smaller the data volume, the greater will be the radius of the gray gradient circle.

At block S15, applying color modulation to the strength gray image to generate a visual energy distribution image.

In at least one embodiment, based on the gray value in the strength gray image, applying color modulation to the strength gray image to generate a visual energy distribution image. Areas corresponding to different gray values display different colors after being color modulated.

In at least one embodiment, the applying color modulation to the strength gray image to generate a visual energy distribution image includes:

Extracting a gray block in the strength gray image, determining a gray value corresponding to the gray block;

Determining a color corresponding to the gray value; and

Based on the color, applying color modulation to the strength gray image to generate a visual energy distribution image.

Figure 2:
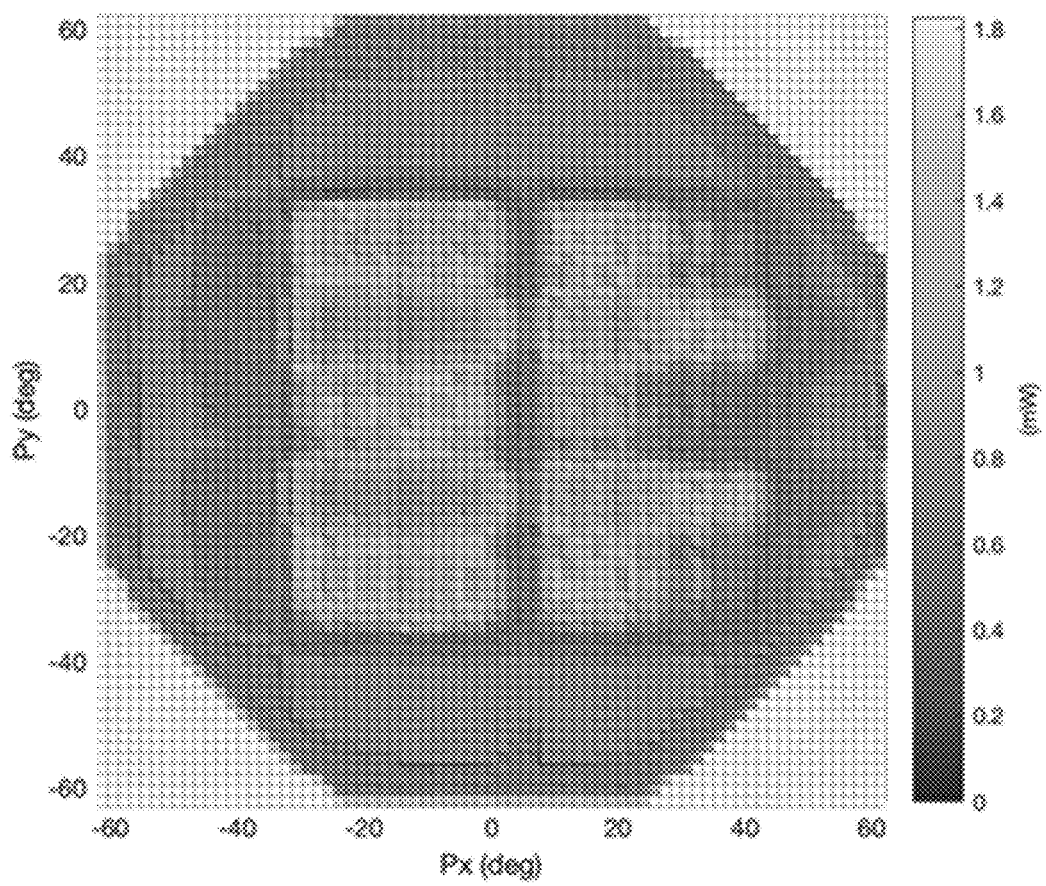
FIG. 2 is a schematic view of at least one embodiment of a scene of visualized energy distribution according to the present disclosure.

Based on the gray value in the strength gray image, extracting a gray block in the strength gray image, one gray block having only one gray value. In at least one embodiment, presetting a gray color mapping table, including a mapping relation of the gray value and the color, based on the gray value, inquiring the gray color mapping table, and determining a color corresponding to the gray value. Based on the color, color modulating the strength gray image to generate a visual energy distribution image, as shown in FIG. 2.

In at least one embodiment, after generating the visual energy distribution image, transmitting the visual energy distribution image to the target user terminal.

The method for visualizing IR strength obtains IR image data transmitted by a light sensor; determines a radiation strength distribution and a module emitting mode corresponding to the IR image data; based on the radiation strength distribution and the module emitting mode, determines whether the IR image data meets a predetermined standard; when it is determined that the IR image data meets the predetermined standard, applies a gray processing to the IR image data to obtain a strength gray image; and applies color modulation to the strength gray image to generate a visual energy distribution image. Thus, effectiveness of the visual energy distribution image is ensured, and efficiency of the IR strength when detecting is improved. The visualization of the IR strength improves detecting efficiency.

Figure 3:
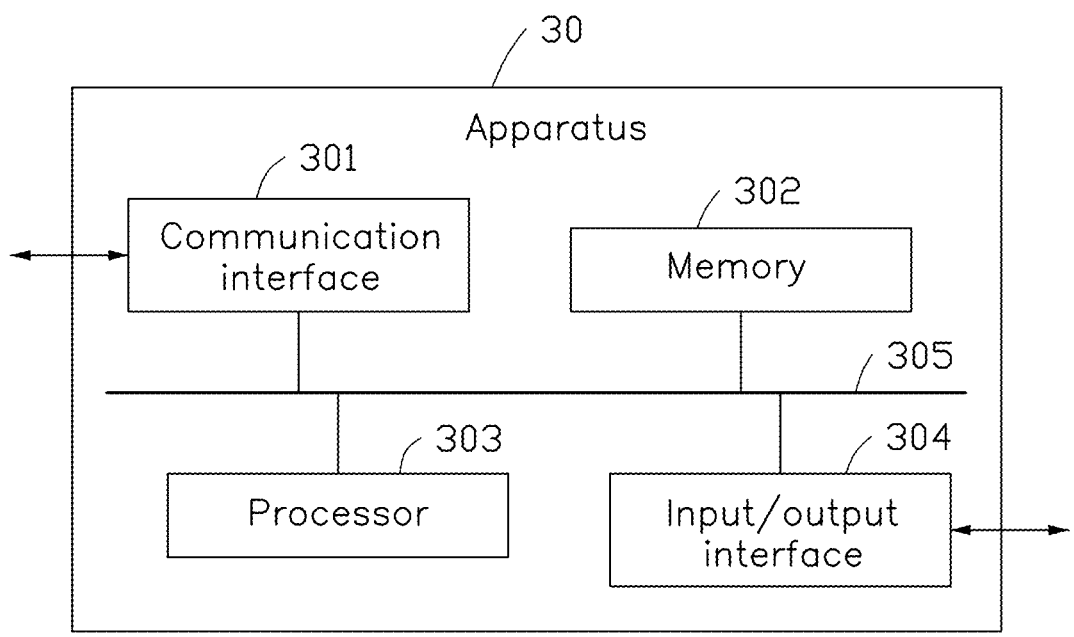
FIG. 3 is a schematic view of at least one embodiment of an apparatus applying the method for visualizing infrared radiation strength according to the present disclosure.

FIG. 3 illustrates an apparatus 30 applying the method for visualizing infrared radiation strength. The apparatus 30 may be a server or a terminal device.

The apparatus 30 may be in a network such as an internet, a wide area network (WAN), a metropolitan area network (MAN), a local area network (LAN), a virtual private network (VPN).

Referring to FIG. 3, the apparatus 30 include a communication interface 301, a memory 302, at least one processor 303, an input/output interface 304, and a bus 305. The at least one processor 303 is coupled to the communication interface 301, the memory 302, and the input/output interface 304 through the bus 305.

The communication interface 301 is configured to communicate with other apparatus or devices. The communication interface 301 may be integrated on the apparatus 30 or newly defined. The communication interface 301 may be a network interface, such as a wireless local area network (WLAN) interface, a cellular network interface, or other combination.

In at least one embodiment, the memory 302 can include various types of non-transitory computer-readable storage mediums. For example, the memory 302 can be an internal storage system, such as a flash memory, a random access memory (RAM) for the temporary storage of information, and/or a read-only memory (ROM) for permanent storage of information. The memory 302 can also be an external storage system, such as a hard disk, a storage card, or a data storage medium.

In at least one embodiment, the processor 303 can be a central processing unit (CPU), a microprocessor, a digital signal processor (DSP), an application specific integrated circuit (ASIC), a field-programmable gate array (FPGA), a data processor chip, a programmable logic device (PLD), a discrete gate/transistor logic device, or a discrete hardware component. The processor 303 may be electrically connected to other elements of the apparatus 30 through interfaces or a bus. In at least one embodiment, the apparatus 30 may further include a plurality of interfaces configured to communicate with other apparatus or devices for exchanging data and information.

The input/output interface 304 is configured to provide input and output for the user, such as the input/output interface 304 includes various types of input/output devices (mouses, keyboards, and/or 3D touch panel), displaying devices for visualizing the information that the user inputs.

The bus 305 is configured to provide communication among the at least one processor 303, the communication interface 301, the memory 302, and the input/output interface 304.

In at least one embodiment, a non-transitory computer program medium may be stored in the memory 302 and processed by the at least one processor 303 to perform the method for visualizing infrared radiation strength as shown in FIG. 1. The non-transitory computer program medium may include a computer program storing area and a data storing area. The computer program storing area may include an operating system and at least one application program for applying corresponding functions. The data storing area may store the data established or used by the apparatus.

In at least one embodiment, the memory 302 stores program instructions, the memory 302 and the program instructions configured to, with the at least one processor 303, cause the apparatus 30 to perform:

obtaining infrared radiation (IR) image data transmitted by a light sensor;

determining a radiation strength distribution and a module emitting mode corresponding to the IR image data;

based on the radiation strength distribution and the module emitting mode, determining whether the IR image data meets a predetermined standard;

when it is determined that the IR image data meets the predetermined standard, gray processing the IR image data to obtain a strength gray image; and applying color modulation to the strength gray image to generate a visual energy distribution image.

The method, the apparatus, and the non-transitory computer program medium for visualizing IR strength obtains IR image data transmitted by a light sensor; determines a radiation strength distribution and a module emitting mode corresponding to the IR image data; based on the radiation strength distribution and the module emitting mode, determines whether the IR image data meets a predetermined standard; when it is determined that the IR image data meets the predetermined standard, gray processes the IR image data to obtain a strength gray image; and applies color modulation to the strength gray image to generate a visual energy distribution image. Thus, an effectiveness of the visual energy distribution image may be ensured, and a detecting efficiency of the IR strength may be improved. Meanwhile, by visualizing IR strength, the detecting efficiency may be further improved.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method of visualizing infrared radiation strength implemented in an apparatus, the method comprising:
    obtaining infrared radiation (IR) image data transmitted by a light sensor;
    determining a radiation strength distribution and a module emitting mode corresponding to the IR image data;
    determining whether the IR image data meets a predetermined standard based on the radiation strength distribution and the module emitting mode;
    gray processing the IR image data to obtain a strength gray image when it is determined that the IR image data meets the predetermined standard;
    applying color modulation to the strength gray image to generate a visual energy distribution image; and
    generating corresponding indication according to a predetermined indication rule when it is determined that the IR image data does not meet the predetermined standard.

2. The method according to claim 1, wherein determining the radiation strength distribution and the module emitting mode corresponding to the IR image data further comprises:
    extracting pixel brightness data from the IR image data;
    inquiring a predetermined brightness radiation mapping table, determining a radiation strength corresponding to the pixel brightness data;
    determining a radiation strength distribution corresponding to the IR image data based on the radiation strength; and
    analyzing the IR image data, determining the module emitting mode corresponding to the IR image data.

3. The method according to claim 2, wherein analyzing the IR image data, determining the module emitting mode corresponding to the IR image data further comprises:
    extracting pixel bright data in the IR image data, and determining a matrix coordinate corresponding to the pixel bright data;
    calculating an image spot density corresponding to the IR image data based on the matrix coordinate; and
    determining the module emitting mode corresponding to the IR image data based on the image spot density.

4. The method according to claim 1, wherein gray processing the IR image data to obtain the strength gray image further comprises:
    extracting an image pixel in the IR image data;
    setting the image pixel as a center of a circle, establishing a gray gradient circle; and
    applying the gray processing to the image pixel to obtain the strength gray image based on the gray gradient circle.

5. The method according to claim 4, wherein applying the gray processing to the image pixel to obtain the strength gray image based on the gray gradient circle further comprises:
    determining a brightness corresponding to the image pixel;
    inquiring a predetermined brightness gray mapping table, determining a gray value corresponding to the brightness; and
    applying the gray processing to the image pixel to obtain a strength gray image based on the gray gradient circle and the gray value.

6. The method according to claim 4, wherein setting the image pixel as the center of the circle, establishing the gray gradient circle further comprises:
    determining a data volume corresponding to the IR image data;
    determining a radius of the gray gradient circle based on the data volume; and
    setting the image pixel as the center of the circle and establishing the gray gradient circle based on the radius.

7. The method according to claim 1, wherein applying color modulation to the strength gray image to generate a visual energy distribution image further comprises:
    extracting a gray block in the strength gray image, determining a gray value corresponding to the gray block;
    determining a color corresponding to the gray value; and
    applying color modulation to the strength gray image to generate a visual energy distribution image based on the color.

8. An apparatus of visualizing infrared radiation strength comprising:
    at least one processor; and
    at least one memory coupled to the at least one processor and storing program instructions;
    the at least one memory and the program instructions configured to, with the at least one processor, cause the apparatus to perform:
        obtaining infrared radiation (IR) image data transmitted by a light sensor;
        determining a radiation strength distribution and a module emitting mode corresponding to the IR image data;
        determining whether the IR image data meets a predetermined standard based on the radiation strength distribution and the module emitting mode;
        gray processing the IR image data to obtain a strength gray image when it is determined that the IR image data meets the predetermined standard;
        applying color modulation to the strength gray image to generate a visual energy distribution image; and generating corresponding indication according to a predetermined indication rule when it is determined that the IR image data does not meet the predetermined standard.

9. The apparatus according to claim 8, wherein determining the radiation strength distribution and the module emitting mode corresponding to the IR image data further comprises:
   extracting pixel brightness data from the IR image data;
   inquiring a predetermined brightness radiation mapping table, determining a radiation strength corresponding to the pixel brightness data;
   determining a radiation strength distribution corresponding to the IR image data based on the radiation strength; and
   analyzing the IR image data, determining the module emitting mode corresponding to the IR image data.

10. The apparatus according to claim 9, wherein analyzing the IR image data, determining the module emitting mode corresponding to the IR image data further comprises:
   extracting pixel bright data in the IR image data, and determining a matrix coordinate corresponding to the pixel bright data;
   calculating an image spot density corresponding to the IR image data based on the matrix coordinate; and
   determining the module emitting mode corresponding to the IR image data based on the image spot density.

11. The apparatus according to claim 8, wherein gray processing the IR image data to obtain the strength gray image further comprises:
   extracting an image pixel in the IR image data;
   setting the image pixel as a center of a circle, establishing a gray gradient circle; and
   applying the gray processing to the image pixel to obtain the strength gray image based on the gray gradient circle.

12. The apparatus according to claim 11, wherein applying the gray processing to the image pixel to obtain the strength gray image based on the gray gradient circle further comprises:
   determining a brightness corresponding to the image pixel;
   inquiring a predetermined brightness gray mapping table, determining a gray value corresponding to the brightness; and
   applying the gray processing to the image pixel to obtain a strength gray image based on the gray gradient circle and the gray value.

13. The apparatus according to claim 11, wherein setting the image pixel as the center of the circle, establishing the gray gradient circle further comprises:
   determining a data volume corresponding to the IR image data;
   determining a radius of the gray gradient circle based on the data volume; and
   setting the image pixel as the center of the circle and establishing the gray gradient circle based on the radius.

14. The apparatus according to claim 8, wherein applying color modulation to the strength gray image to generate a visual energy distribution image further comprises:
   extracting a gray block in the strength gray image, determining a gray value corresponding to the gray block;
   determining a color corresponding to the gray value; and
   applying color modulation to the strength gray image to generate a visual energy distribution image based on the color.

15. A non-transitory computer readable medium comprising program instructions for causing an apparatus to perform:
   obtaining infrared radiation (IR) image data transmitted by a light sensor;
   determining a radiation strength distribution and a module emitting mode corresponding to the IR image data;
   determining whether the IR image data meets a predetermined standard based on the radiation strength distribution and the module emitting mode;
   gray processing the IR image data to obtain a strength gray image when it is determined that the IR image data meets the predetermined standard;
   applying color modulation to the strength gray image to generate a visual energy distribution image; and
   generating corresponding indication according to a predetermined indication rule when it is determined that the IR image data does not meet the predetermined standard.

* * * * *